Patented Aug. 7, 1934

1,969,449

UNITED STATES PATENT OFFICE 1,969,449

PROCESS OF PRODUCING BY-PRODUCT CALCIUM SULPHATE

Charles S. Bryan, Rumford, R. I., assignor to Rumford Chemical Works, Rumford, R. I., a corporation of Rhode Island No Drawing. Application October 17, 1931, Serial No. 569,543

8 Claims. (Cl. 106—34)

The subject matter herein presented involves the treatment of phosphoric materials and with particular reference to the production of certain important by-products of such processes.

More specifically, my present invention provides for the improvement in quality of by-product calcium sulphate produced when phosphoric materials are treated with sulphuric acid as in the manufacture or purification of phosphoric acid. My invention contemplates the production of such calcium sulphate or synthetic gypsum of a high quality and from which according to my invention I produce a plaster of Paris of great strength.

In such manufactures the raw phosphate bearing material is usually an impure calcium phosphate and small but persistent amounts of fluorine present in the phosphate rock are carried through and appear as undesirable or deleterious factors in the acid and ultimate by-products, notably in the calcium sulphate above noted. In this the fluorine traces tend to destroy the usefulness of the calcium sulphate for plaster of Paris where any considerable strength is required, as for building purposes, and for such purposes the requirements are high and the test exacting. The matter of strength is therefore of great importance as it affects the saleability of the plaster or the blocks or other articles made from it.

The strength of the plaster may be increased according to my invention by improving the crystallizing properties of the plaster by processing in the course of manufacture to eliminate or reduce certain deleterious impurities.

In the manufacture of phosphoric acid by the sulphuric acid process, the preliminary step is the decomposition of finely ground phosphate bearing material with sulphuric acid. During this decomposition free phosphoric acid is formed in solution and calcium sulphate in the form of $CaSO_4 2H_2O$ (commonly known as gypsum) is precipitated. In addition, small amounts of fluorine are set free by the sulphuric acid and partly volatilized, partly dissolved in the phosphoric acid and partly remain in some insoluble form in the residual gypsum.

My invention relates to the elimination of these small quantities of fluorine from the calcium sulphate because in subsequent utilization of this material they are very deleterious to the quality of the product to be obtained.

It is a well known property of fluorine that it will exist as hydrofluoric acid or as hydrofluosilicic acid or silicon tetrafluoride, and I have found that the conversion of substantially all of the fluorine to the silicic combination causes the elimination of it to a greater extent than if it remained only partly uncombined with silica.

I cannot explain the cause by any particular theory of the improvement of the strength of the gypsum by the conversion of the fluorine to the silicious combination, but I have found that the gypsum produced by my process is in a coarser crystalline condition and that the strength of the resulting plaster manufactured from this gypsum is greatly increased. I have also found that I can control the size and shape of my gypsum crystals by varying the amount of fluorine combined in silicious form.

In the practice of my invention I preferably mix with the ground crude phosphate a certain amount of silica in hydrated form either as diatomaceous earth or material of similar chemical characteristics. This may be accomplished in the mixer where the phosphate material meets the sulphuric acid or in a preliminary grinding process either wet or dry. For example, I have found that by adding about 20 pounds of diatomaceous earth to a ton of ground phosphate rock that when processed the by-product calcium sulphate resulting from this mixture has greatly improved qualities and a lower fluorine content.

After separating the calcium sulphate or gypsum from the phosphoric acid and washing it thoroughly to remove all acidic material, the gypsum is calcined according to the well known process of manufacturing plaster of Paris. The gypsum prepared in accordance with my invention has a much higher breaking strength than the gypsum prepared by the usual method without the addition of diatomaceous earth.

It is well known that phosphate rock contains small amounts of silica and it is also well known that the silica in the phosphate rock is either not in sufficient quantity to convert its fluorine content into the silicious combination or else that it is not of the proper chemical quality to cause this conversion and the basis of my invention is the addition of the correct quality and quantity of silicious material to cause the conversion of the fluorine to the silicious combination as required.

It may be advanced as a tentative theory that the conversion of the fluorine to a silicious combination acts on my gypsum perhaps in several ways. In the first place, it causes the fluorine to become more volatile and thus a greater amount is eliminated from the mixer which operates at a high temperature. In the second place, the fluorine becomes more soluble in the phosphoric acid in the silicious condition and therefore less remains in the gypsum. Third, it is possible that the SiF₆ ion, being of milder acidic value, has a tendency to cause larger crystals of gypsum than the F ion which is more intensely acidic. I offer this merely as tentative theory but the results of my process are definite and practical and my invention may be practiced regardless of theory.

What I therefore claim and desire to secure by Letters Patent is:

1. In the production of plaster of Paris from by-product calcium sulphate from acid manufacture utilizing phosphatic sources containing fluorine, those steps consisting in mixing with the phosphate a hydrated silica, in carrying through the acid reaction with the phosphate, in separating the calcium sulphate so formed and in washing and calcining.

2. In the production of plaster of Paris from by-product calcium sulphate from acid manufacture utilizing phosphatic sources containing fluorine, those steps consisting in mixing with the phosphate hydrated silica of infusorial origin, in carrying through the acid reaction with the phosphate, in separating the calcium sulphate so formed and in washing and calcining.

3. In the processing of by-product calcium sulphate from acid manufacture utilizing phosphatic sources containing fluorine, those steps consisting in pre-mixing with the phosphate a hydrated silica, in carrying through the acid reaction with the phosphate, and in separating the calcium sulphate so formed.

4. In the processing of by-product calcium sulphate from acid manufacture utilizing phosphatic sources containing fluorine, those steps consisting in pre-mixing with the phosphate hydrated silica of infusorial origin, in carrying through the acid reaction with the phosphate, and in separating the calcium sulphate so formed.

5. In the production of by-product calcium sulphate from acid manufacture utilizing phosphatic sources containing fluorine, those steps consisting in reacting the phosphate and acid in a hydrated silica, and in separating the calcium sulphate so formed.

6. In the production of by-product calcium sulphate from acid manufacture utilizing phosphatic sources containing fluorine, those steps consisting in reacting the phosphate and acid in hydrated silica of infusorial origin, and in separating the calcium sulphate so formed.

7. In the production of plaster of Paris, those steps consisting in mixing a phosphate source containing fluorine, a hydrated silica, in reacting with acid to produce calcium sulphate substantially free from fluorine and of high crystalline development.

8. In the production of plaster of Paris, those steps consisting in mixing a phosphate source containing fluorine with a hydrated silica, and in reacting with the acid to produce calcium sulphate and phosphoric acid having the fluorine therein as silicon tetrafluoride.

CHARLES S. BRYAN.